INVENTORS
RICHARD C. OLSEN
FRED L. REMMELE
JAMES W. TOENSING
BY
Carpenter, Abbott, Coulter, & Kinney

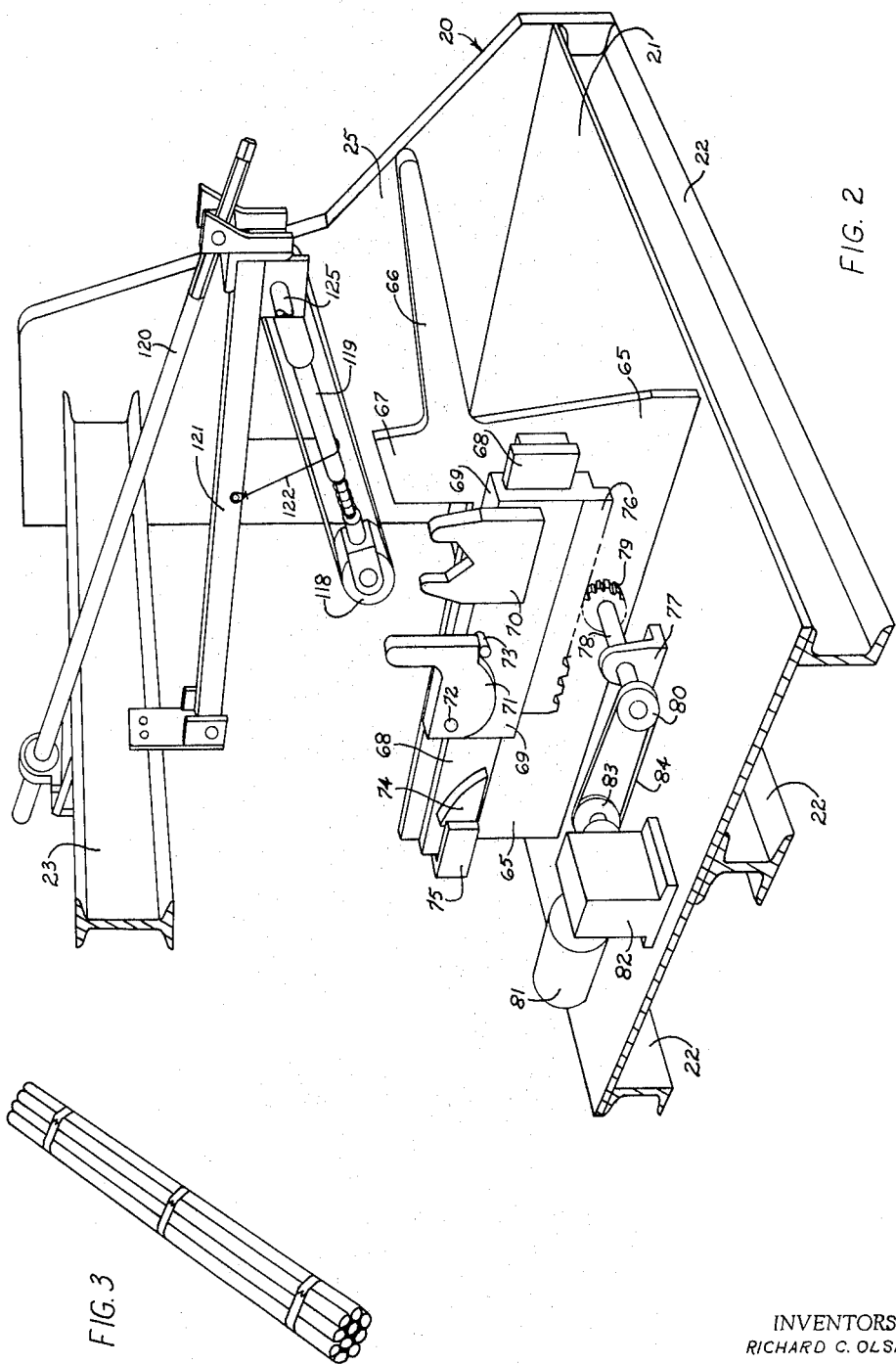

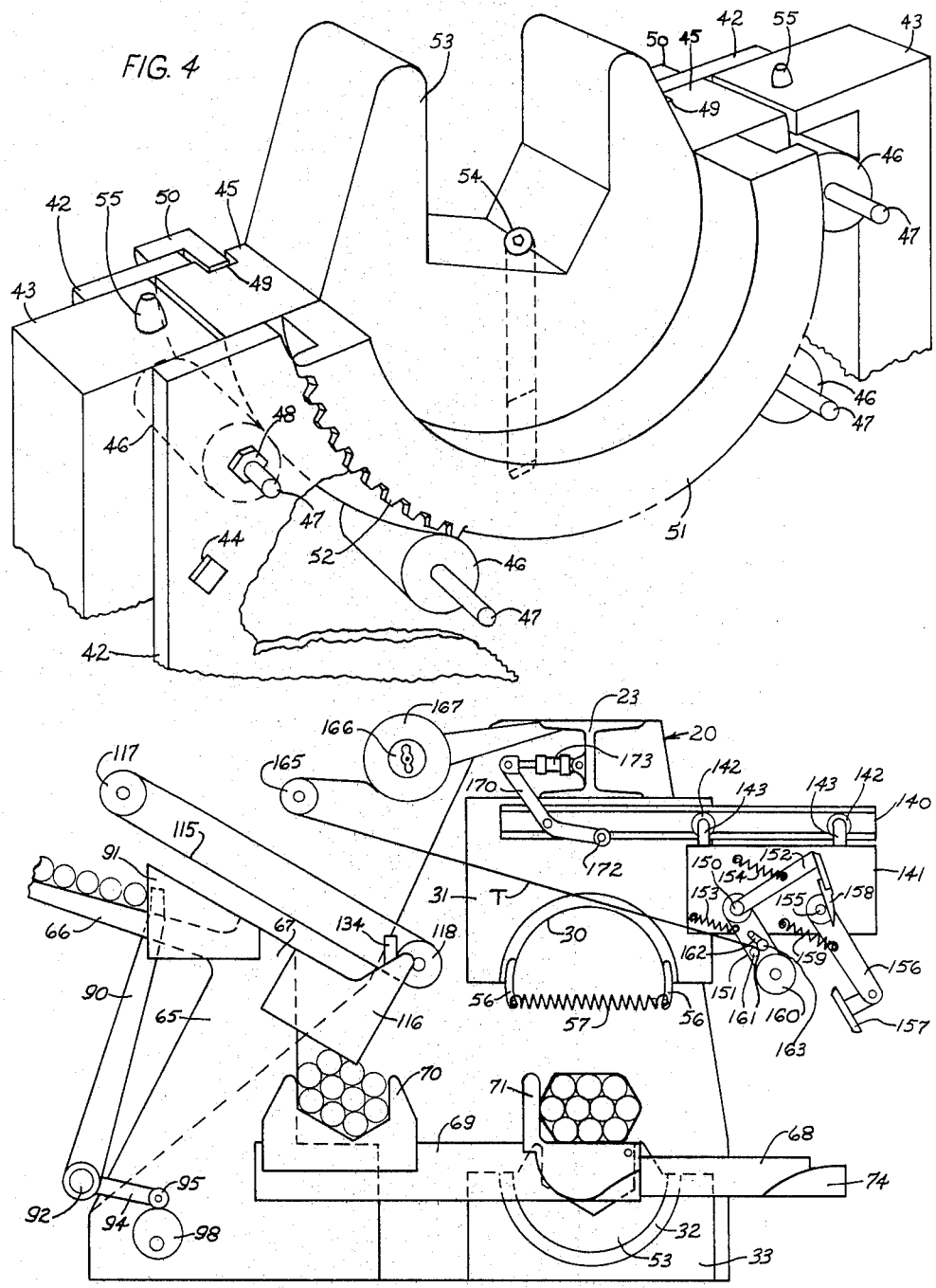

INVENTORS
RICHARD C. OLSEN
FRED L. REMMELE
JAMES W. TOENSING

BY Carpenter, Abbott, Coulter & Kinney

July 26, 1966  R. C. OLSEN ET AL  3,262,246
WRAPPING MACHINE

Filed June 26, 1962  8 Sheets-Sheet 8

INVENTORS
RICHARD C. OLSEN
FRED L. REMMELE
JAMES W. TOENSING
BY
Carpenter, Abbott, Coulter & Kinney United States Patent Office 3,262,246
Patented July 26, 1966

3,262,246
WRAPPING MACHINE
Richard C. Olsen and Fred L. Remmele, St. Paul, and James W. Toensing, Minneapolis, Minn., assignors to Minnesota Mining and Manufacturing Company, St. Paul, Minn., a corporation of Delaware
Filed June 26, 1962, Ser. No. 205,253
10 Claims. (Cl. 53—198)

The present invention relates to a machine for wrapping a plurality of articles together with a wrapping strip. More particularly, the present invention relates to a machine for successively forming orderly bundles containing a plurality of elongate articles to be wrapped together, means for wrapping the bundles with a wrapping strip, and means for transporting the formed bundles from the forming means to the wrapping means and for simultaneously transporting bundles which have been wrapped away from the wrapping means.

A machine of the present invention is useful for bundling such articles as conduit, tubing, lumber, extrusions and other long, slender objects at higher speeds than have heretofore been attainable. This is accomplished by an improved wrapping means which includes means for holding the articles and means for rotating the holding means to cause the articles to be rotated (instead of holding the articles still and rotating the wrapping mechanism around them) and the use of means which simultaneously transports articles which are to be wrapped toward the wrapping means and articles which have been wrapped away from the wrapping means. Also, the forming means of the present invention forms a new bundle to be wrapped during the time in which the previously formed bundle is being wrapped, so that the machine can operate continuously at a relatively high rate of speed.

While a machine of the present invention can be made in such a way as to employ almost any type of wrapping material, such as steel strap, rope, wire, etc., the machine shown in the accompanying drawings has been adapted to use a filament reinforced tape which has a pressure-sensitive adhesive coating on one side. The illustrative embodiment which is shown in the drawings was particularly adapted for the purpose of wrapping bundles of tubularly shaped conduit pipe, and, although such a machine will usually be constructed so as to contain a plurality of stations which each contain all of the parts which are described hereinafter and will provide more than one wrap around the bundle, only one of such stations has been shown in the accompanying drawings, for reasons of clarity. A machine has been built which contained three separate stations and which wrapped three bands of tape around bundles containing 20 foot lengths of such tubes at the rate of six bundles in one minute.

The other objective and advantages of the present invention will be apparent from the following description of the embodiment shown in the accompanying drawings, wherein like reference characters refer to corresponding parts in the several views, and in which:

FIGURE 2 is a front perspective view looking at the other side of the station which is shown in FIGURE 1 after some of the parts which were removed have been replaced and others have been removed, for reasons of clarity;

FIGURE 3 shows a bundle of tubes which has been formed and wrapped by a machine of the present invention;

FIGURE 4 is an enlarged perspective view showing the detailed construction of the lower jaw of the machine shown in FIGURE 1;

FIGURE 5 is a schematic side elevational view of the side of the machine which is shown in FIGURES 1 and 2, showing the parts thereof in rest position, so that the machine is ready to begin operation;

Figure 1:
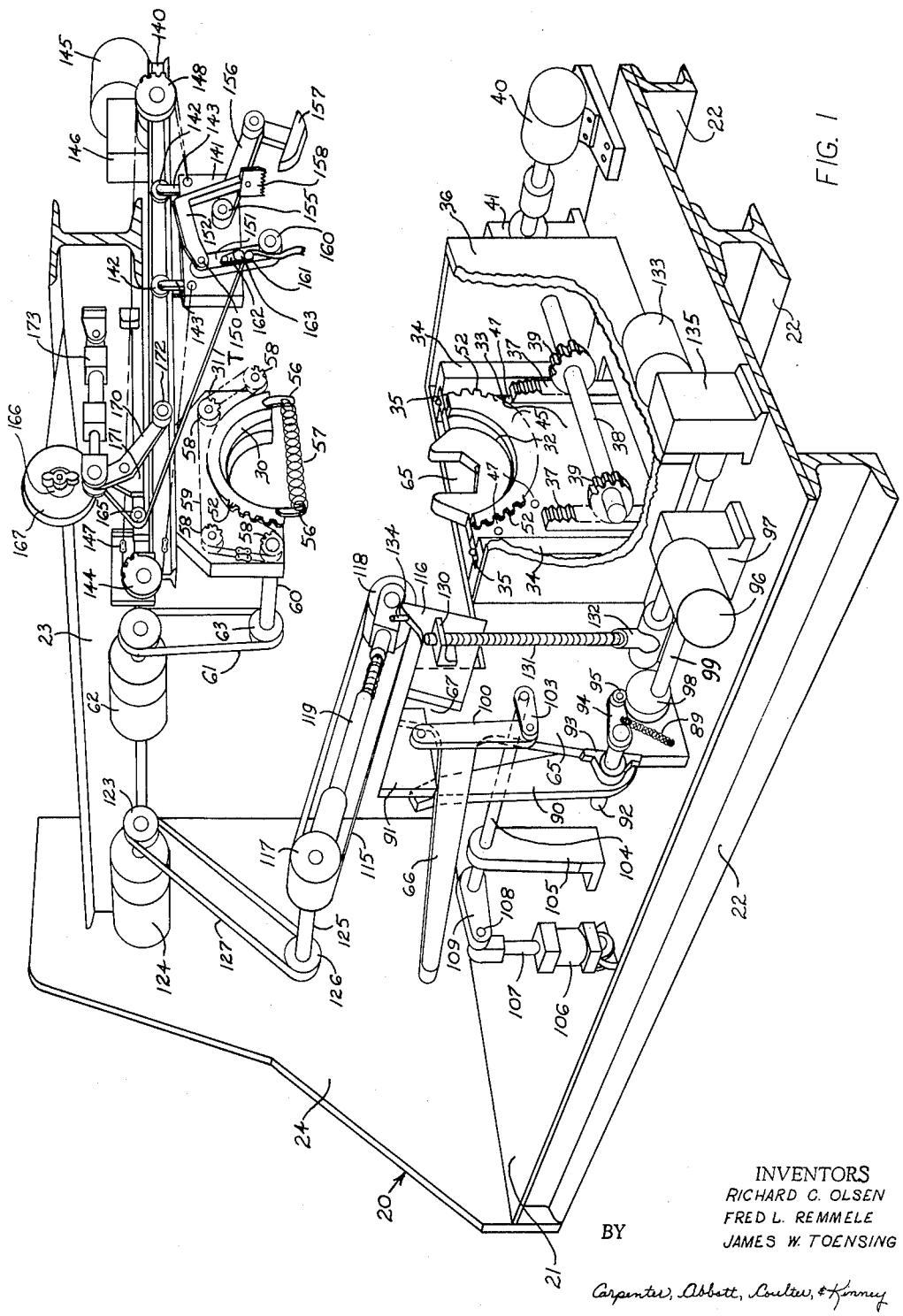
FIGURE 1 is a front perspective view of one station in a machine of the present invention, showing the parts thereof in rest position, and with some of the parts removed and others partially broken away, for reasons of clarity.

Referring first to FIGURES 1 and 2, it will be seen that the frame 20 of the machine is comprised of a platform 21, which is supported by three beams 22, and a strongback beam 23 which is supported horizontally above platform 21 by attachment at each of its ends to two vertical plates 24 and 25 which are affixed to each end of platform 21. A first or upper semi-circularly shaped jaw 30 is rotatably attached to a jaw plate 31, and said jaw plate is affixed to the lower surface of the strongback beam 23. A second or lower semi-circularly shaped jaw 32 is rotatably attached to a jaw plate 33, and said jaw plate is movably attached to platform 21 in such position that when jaw plate 33 is moved upwardly from platform 21 the lower jaw 32 will be moved toward and into contact with the upper jaw 30. Thereafter, the upper jaw 30 and lower jaw 32 are rotated while they are held into contact with each other with the bundle which is to be wrapped held between them.

The jaw plate 33 is slidably held in a position perpendicular to the surface of platform 21 between two slide plates 34. The slide plates 34 are attached to platform 21 and extend upwardly therefrom along each end of jaw plate 33, and said slide plates each contain a notched recess 35 in which said jaw plate can slide and be guided during the movement of said jaw plate toward and away from the upper jaw 30. A housing 36 is attached to platform 21 around the four sides of slide plates 34 and jaw plate 33, and the top of said housing is left open in order to permit the lower jaw 32 to be raised out of said housing. A pair of rack gears 37 are affixed to the side of jaw plate 33. An axle 38 is rotatably journaled through the sides of housing 36, and two pinion gears 39 are affixed to said axle in position to engage with the rack gears 37. A motor 40 is attached to platform 21, and the drive shaft from said motor is attached through a reduction gear box 41 to the axle 38, so that the operation of said motor will result in the movement of jaw plate 33 toward and away from the upper jaw 30.

The detailed construction of the upper jaw 30 is similar to that of the lower jaw 32, and the construction of lower jaw 32 is shown in FIGURE 4. The jaw plate 33 is there seen to be comprised of two side plates 42 which are spaced from each other by two end plates 43, and the side plates 42 are attached to each other by bolts 44 which extend through said side plates and end plates 43. End plates 43 extend outwardly beyond the side plates 42 and the extending portions of end plates 43 slide in the notched recess 35 in slide plate 34. Each of the side plates 42 is formed to contain a corresponding semi-circular shaped recess in the central portion of the upper surface of said plates, and a semi-circularly shaped ring 45 is rotatably carried within said recess by four bearings 46 which are rotatably positioned between the side plates 42 on bolt-axles 47 which are attached through said side plates and held by nuts 48. The ring 45 is formed to contain a semi-circularly shaped recess 49 around one side thereof, and a semi-circularly shaped retaining flange 50 containing a right angle bend therein is affixed to one of the side plates 42 in such position that said flange projects into the recess 49, so that ring 45 cannot be pulled directly out of the recess in side plates 42, although said ring can be so removed by rotating it through 180 degrees.

A semi-circularly shaped sprocket 51 is affixed to ring 45 on the side thereof which is opposite from the recess 49, and said sprocket is formed and attached so that the teeth 52 thereof are spaced outwardly from the side plate 42. A removable insert 53 is attached to ring 45 by a bolt 54, and, since the size of said insert will depend on the size of the bundle to be wrapped, other similarly shaped inserts of various sizes can be substituted therefor by removing and reinserting the bolt 54. A pair of lugs 55 are affixed to the upper surface of end plates 43, and recesses which are similarly shaped are formed in the bottom of the upper jaw plate 31, in order to stabilize the jaws 30 and 32 when they are held in contact with each other and rotated together.

The detailed construction of upper jaw 30 is the same as it is for lower jaw 32, except that upper jaw 30 does not contain an insert such as the removable insert 53 of the lower jaw. Instead, upper jaw 30 is provided with a pair of extensions 56 which are attached to the ends of the ring and a spring 57 is attached to each of those extensions and extended across the concave side of the ring, as is shown in FIGURE 1. Also, four sprockets 58 are rotatably attached to upper jaw plate 31, and a chain 59 extends around each of said sprockets and around the teeth on the sprocket of the upper jaw 30. A drive rod 60 is attached through upper jaw plate 31 to one of the sprockets 58, and a pulley 63 which is attached to the other end of said drive rod is attached by a belt 61 to a motor 62 containing a circular shaped reducing gear and which is affixed to strongback beam 23, so that the operation of said motor when the lower jaw 32 is held into contact with the upper jaw 30 will cause the chain 59 to engage the teeth 52 on both the lower jaw 32 and upper jaw 30, to rotate both of said jaws when the articles are to be wrapped.

The detailed construction of both the means for forming the bundles of articles to be wrapped and for transporting the bundles of articles is shown in FIGURES 1 and 2, wherein it can be seen that a side plate 65 of housing 36 extends beyond said housing, and the extending part of said plate is shaped to form a support bar 66 and a conveyor plate 67. The transporting means comprises a slide plate 68 which is affixed to the other side of side plate 65 from that side of said plate which is adjacent to the lower jaw 32, and a carriage plate 69 which is slidably attached to slide plate 68 by means of flanges from said carriage plate which extend around said slide plate. A carriage stand 70 is affixed to carriage plate 69 and an ejection stand 71 is pivotably attached by a pin 72 to carriage plate 69. A pin 73 is attached to carriage plate 69 to prevent the ejection stand from pivotal movement downwardly beyond the position in which it is shown in FIGURE 2, and a cam plate 74 is affixed to an angle bracket 75 to cause ejection stand 71 to be pivoted upwardly from that position upon movement of said stand into contact with said cam plate. Angle bracket 75 is affixed to slide plate 68 and extends outwardly from said plate for a distance in excess of the thickness of carriage plate 69, so that said carriage plate can pass between slide plate 68 and cam plate 74, and such movement can cause contact between ejection stand 71 and cam plate 74.

A rack gear 76 is attached to the bottom surface of carriage plate 69. A bearing bracket 77 is affixed to platform 21 and an axle 78 is journaled through said bracket. A pinion gear 79 is attached to one end of axle 78 in such position as to engage with the teeth on rack gear 76, and a pulley 80 is attached to the other end of said axle. A motor 81 is attached to platform 21, and the drive shaft from said motor is attached to a reduction gear box 82 which is attached to platform 21. A pulley 83 is attached to the drive shaft of reduction gear box 82, and a belt 84 is attached around the pulley 83 and the pulley 80 on axle 78, so that the operation of motor 81, first in one direction and then in the other, will cause carriage plate 69 to be moved back and forth on the slide plate 68, to transport the articles which are to be wrapped into position between the upper jaw 30 and the lower jaw 32, and, at the same time, to transport the articles which have been wrapped away from said jaws and to cause them to be ejected from the machine.

The means for successively forming the articles into bundles which are to be transported and wrapped by the machine includes a stop gate arm 90 and a shift block 91 which are attached to the side plate 65, as is shown in FIGURE 1. Stop gate arm 90 is affixed to an axle 92, and the axle 92 is journaled through a bracket 93 which is affixed to side plate 65. An arm 94 is affixed to the other end of axle 92, and a cam follower 95 is rotatably attached to the end of said arm. A motor 96 is attached to a reduction gear box 97, and said gear box is attached to the platform 21. The drive shaft from motor 96 is attached to gear box 97. A circularly shaped cam 98 is eccentrically attached to the drive shaft 99 from gear box 97, and said cam is positioned so that the periphery thereof engages the cam follower 95 on the arm 94. A spring 89 is attached to arm 94 and to side plate 65. Thus the operation of motor 96 causes axle 92 to be pivoted in bracket 93, and results in the movement of stop gate arm 90 along the upper surface of support bar 66 toward and away from conveyor plate 67. The articles to be wrapped are placed in side-by-side relationship in a row on support bar 66 and move by force of gravity down the slope of support bar 66 until the first article contacts either shift block 91 or the end of stop gate arm 90 which protrudes above said support bar, and said stop gate arm is adjustably positioned in order to control the amount of movement of said row of articles to select the number of articles which are to be included within a bundle, as will be hereinafter described.

The shift block 91 is attached to one end of a push rod 100, and said shift block is slidably attached to side plate 65 by means of keyed tracks which are not shown in the drawings. The other end of push rod 100 is pivotably attached to a crank rod 103, and the other end of said crank rod is affixed to the end of an axle 104. The axle 104 is journaled through side plate 65 and a bearing bracket 105 which is attached to platform 21, so that said axle is rotatable in said bracket and said plate. A double-acting air cylinder 106 is attached to platform 21, and the drive rod 107 from said cylinder is pivotably attached at 108 to one end of a crank arm 109. The other end of crank arm 109 is affixed to axle 104, so that the operation of air cylinder 106 will cause shift block 91 to be moved in a back and forth movement to a position above support bar 66, as is shown in FIGURE 1, and to a position in which the upper surface of said shift block is below the upper surface of said support bar.

The shift block 91 is shaped and positioned so that the side of said block which is most remote from conveyor plate 67 will move up and down at the same place along support bar 66 as is occupied by the side of stop gate arm 90 which is most remote from conveyor plate 67 when said stop gate arm is moved to the extent of the movement of said stop gate arm away from said conveyor plate, and so that the uppermost surface of shift block 91 will provide an even slope with the upper surface of conveyor plate 67 when said shift block is moved to the extent of its movement above support bar 66, which is the position which is shown in FIGURE 1. Thus the number of articles which are shifted out of the row on support bar 66 by the movement of shift block 91 when said block is moved upwardly to intersect with the row of articles will be those which have been permitted to move beyond the edge of shift block 91 which is most remote from conveyor plate 67 by moving stop gate arm 90 toward conveyor plate 67, and the distance of this movement of stop gate arm 90 is controlled by the size and movement of cam 98 to provide the number of articles which are to be removed from the row. This movement of stop gate arm 90 is accomplished during the time at which shift block 91 is in intersecting relationship with the row of articles, during which time said shift block prevents the movement of the row of articles toward the stop gate arm 90, and the positioning of stop gate arm 90 at that time will determine the number of articles which are removed by shift block 91 when said shift block is next moved into intersecting relationship with the row of articles.

A conveyor belt 115 is adjustably positioned above conveyor plate 67 for a distance equal to the diameter of the articles to be wrapped, and said conveyor belt extends parallel to the upper surface of said conveyor plate and the upper surface of shift block 91 in order to convey the shifted articles from the position into which they are moved by said shift block to a movable cradle 116. Conveyor belt 115 is attached around a drive pulley 117 and a driven pulley 118, and said pulleys are attached to opposite ends of a telescopically movable strut 119. As is shown in FIGURE 2, the strut 119 is adjustably attached by a pair of booms 120 and 121 to strongback beam 23, and a sling 122 is attached from the boom 120 and around the strut 119 in order to stabilize the positioning of strut 119. A motor 124, containing a circular shaped reducing gear, is attached to strongback beam 23, and a pulley 123 is attached to the drive shaft from said reducing gear. An axle 125 is attached through the middle of drive pulley 117, and a pulley 126 is affixed to one end of said axle. A belt 127 is attached around the pulley 126 and the pulley 123, so that the operation of motor 124 will cause the conveyor belt 115 to be moved to carry the shifted articles from shift block 91 across the top surface of conveyor plate 67 and deposit them into the movable cradle 116.

An angle bracket 130 containing a threaded aperture is affixed to the side of cradle 116, and one end of a screw 131 is threaded through the aperture in said bracket. The other end of screw 131 is attached to a right angle drive box 132, and said drive box is attached to platform 21. A motor 133 is attached to a gear box 135, and said gear box is attached to platform 21. The drive shaft from gear box 135 is attached to right angle drive box 132. Thus the operation of motor 133 will cause screw 131 to be rotated in one direction and then in the other direction as said motor is operated in alternate directions, and said operation of the motor 133 will result in moving cradle 116 toward and away from platform 21.

The upper surface of cradle 116 is shaped to stop the movement of the shifted articles by the conveyor belt 115, and a pin 134 is also movably positionable into one of a series of holes formed in the upper surface of cradle 116 in order to aid in stopping that movement of those articles within the cradle. Carriage stand 70, removable insert 53 and cradle 116 are similarly shaped in order to preserve the shape of the bundle. The cradle 116 is moved into the position in which it is closest to conveyor belt 115 when the first articles of a bundle are deposited into the cradle, and the cradle is then moved toward platform 21 a distance approximately equal to the width of the articles in order to provide a space on top of those articles for the next groups of articles which are to be formed into the bundle. After the cradle 116 has thus been moved downwardly in steps during the formation of the bundle, the cradle is then moved in one motion to the extent of its movement toward platform 21. At that time the carriage plate 69 is in the position in which it is shown in FIGURE 2, with the carriage stand 70 located directly beneath cradle 116, and, since cradle 116 is moved downwardly beyond the position of said carriage stand, the formed bundle is deposited into the carriage stand 70, and thereby removed from cradle 116. The carriage plate 69 is then moved to transport the bundle which is to be wrapped to the position in which it is positioned directly over the lower jaw 32, so that the movement of said jaw will remove the bundle from carriage stand 70 and carry it upwardly to a position between said lower jaw and upper jaw 30, where the bundle is wrapped as the jaws are rotated. During that time the cradle 116 is moved to the extent of its movement away from platform 21 to begin the operation of forming another bundle, as will be further described hereinafter.

The tape attaching means are attached to strongback beam 23 in a position adjacent to the upper jaw 30, as is shown in FIGURE 1. A track beam 140 is affixed at right angles to the lower surface of strongback beam 23, and a tape deck plate 141 is movably attached to said track beam by rollers 142 which are positioned between flanges on each side of said beam, and said rollers are attached by extensions 143 to said tape deck plate. A sprocket 144 is rotatably attached to a bracket affixed to the upper surface at one end of track beam 140, and a motor 145 and a reducing gear 146 are attached to the upper surface of the other end of said track beam. The drive shaft from motor 145 is connected to reducing gear 146, and the drive shaft from said reducing gear is journaled through track beam 140 and a sprocket 148 is affixed to said drive shaft. One end of a chain 147 is attached to one end of tape deck plate 141, and said chain is attached around the sprocket 144 and the sprocket 148, and the other end of the chain 147 is attached to the other end of tape deck plate 141, so that the operation of said motor in opposite directions will cause tape deck plate 141 to be moved toward and away from upper jaw 30 on track beam 140.

Referring now to FIGURES 1 and 5, a stub shaft 150 is attached to the side of tape deck plate 141, and a taping arm 151 and a knife arm 152 are pivotably attached to said stub shaft. A spring 153 is attached to taping arm 151 and to tape deck plate 141, and a spring 154 is attached to knife arm 152 and to said tape deck plate, in order to bias said arms into the positions in which they are shown in those drawings. A stub shaft 155 is attached to tape deck plate 141, and a buffing arm 156 is pivotably attached to said stub shaft. A spring 159 is attached to buffing arm 156 and to tape deck plate 141, to bias said arm into the position in which it is shown in those drawings. A buffing ski 157 is attached to the unattached end of buffing arm 156, and a knife blade 158 is affixed to the unattached end of knife arm 152. An applying roller 160 is rotatably attached to the unattached end of taping arm 151. A knurled one-way guide roller 161 is attached to taping arm 151 between stub shaft 150 and applying roller 160, and said roller is arranged so that it is rotatable in the clockwise direction, when viewed as shown, but said roller is prevented from rotating in the counterclockwise direction. A pinch plate 162 is pivotably attached to taping arm 151 between stub shaft 150 and applying roller 160, and a pinch roller 163 is rotatably attached to the unattached end of said plate. The pinch plate 162 contains a spring which causes the pinch roller 163 to be biased against the guide roller 161.

A guide roller 165 is rotatably attached to the bracket on the upper surface of track beam 140, and a tape hub 166 is rotatably attached to strongback beam 23. A supply roll 167 of tape having a pressure-sensitive adhesive coating on one side thereof is mounted on hub 166, and the tape T which is unwound from said roll is threaded around guide roller 165, with the nonadhesive side of the tape in contact with said roller. The tape T is then threaded between guide roller 161 and pinch roller 163, with the adhesive side of the tape in contact with guide roller 161, and the end of the tape is positioned adjacent to the periphery of applying roller 160, as is shown in FIGURES 1 and 5. Thus, when the bundle to be wrapped is held between upper jaw 30 and lower jaw 32 and motor 145 is operated to move tape deck plate 141 toward the jaws, the end of the tape will be pressed by applying roller 160 against the periphery of the bundle, to tack the tape to the bundle, and buffing ski 157 will thereafter bear against the back of the tape to attach the tape to the bundle as the bundle is rotated by the rotational movement of the jaws.

A cut-off arm 170 is rotatably attached intermediate the ends thereof to a bracket 171 which is affixed to the top of track beam 140, and a roller 172 is rotatably attached to one end of said cut-off arm. A single-acting spring-return air cylinder 173 is attached to strongback beam 23, and the drive rod from said cylinder is attached to the other end of cut-off arm 170. Thus, when air is admitted to the chamber of air cylinder 173 the drive rod is moved into said cylinder, causing cut-off arm 170 to be rotated to move roller 172 downwardly toward upper jaw 30 and into contact with the side of knife arm 152. The continuation of this movement of cut-off arm 170 causes knife arm 152 to be pivoted in the clockwise direction, when viewed as shown, to carry knife blade 158 against the tape to sever the tape across the width thereof after a desired number of wraps of tape have been wrapped around the bundle. Thereafter, the motor 145 is operated in the opposite direction to move tape deck plate back into its original position after the wrapped bundle has been removed from between the jaws.

The sequential operation of this machine in connection with a 10 tube bundle is shown schematically in FIGURES 5 through 15, and a bundle which would be formed and wrapped by such a machine which contains three separate and coordinated stations similar to the one which has been described above would appear as is shown in FIGURE 3. A source of electrical power is necessary in order to operate the motors described above, and a supply of compressed air is necessary in order to operate the air cylinders. Also, the operation will be accomplished more quickly if the electrical power and air supply are controlled through a switch panel in a known manner, in order to coordinate and properly time the action of the parts. The tape is threaded in the machine as is described above, and, as is shown in FIGURE 5, the continuous operation of the machine begins with a supply of tubes resting on support bar 66, and with a formed bundle to be wrapped supported by carriage stand 70 and a bundle which has been previously wrapped supported by ejection stand 71.

Figure 6:
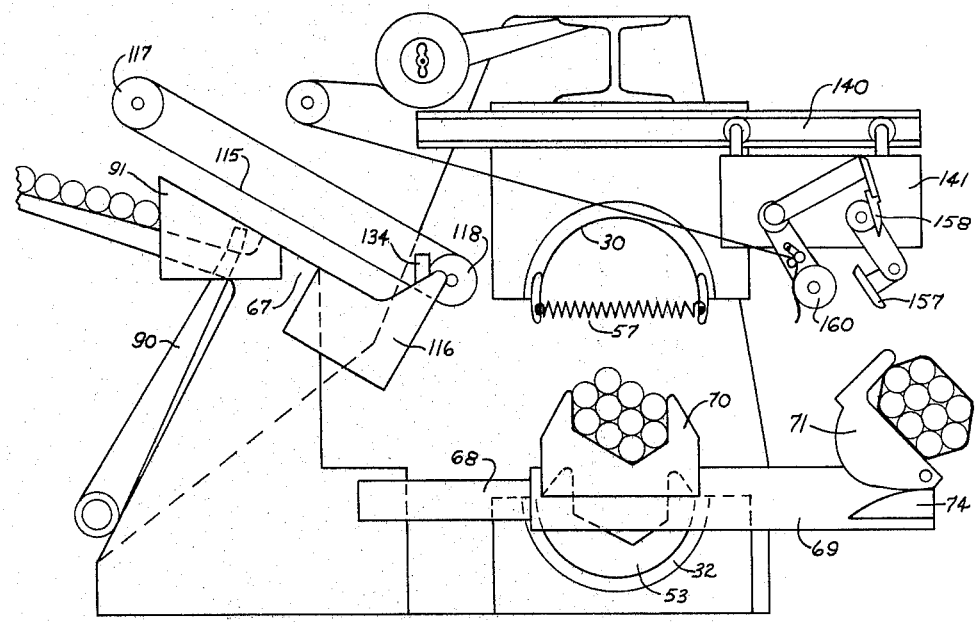
FIGURES 6 through 15 are schematic side elevational views which are similar to FIGURE 5, and which show the machine in successive positions during one complete operating sequence of the machine.

Referring now to FIGURE 6, carriage plate 69 is moved to transport the bundle which has been previously formed, and which is now to be wrapped, into position above lower jaw 32. That movement of carriage plate 69 causes ejection stand 71 to contact cam plate 74, and ejection stand 71 is pivoted upwardly and the previously wrapped bundle is caused to slide off of said stand and drop out of the machine. Meanwhile, shift block 91 is in intersecting relationship with the row of tubes, to prevent the movement of the tubes toward stop gate arm 90, and said stop gate arm is moved toward cradle 116 by rotating cam 98 until said stop gate arm is positioned a distance from the first tube which is equal to the diameter of three tubes. Also, cradle 116 is then positioned in the position in which it is most remote from platform 21, in which position the upper surface of said cradle is even with the upper surface of conveyor plate 67.

Figure 7:
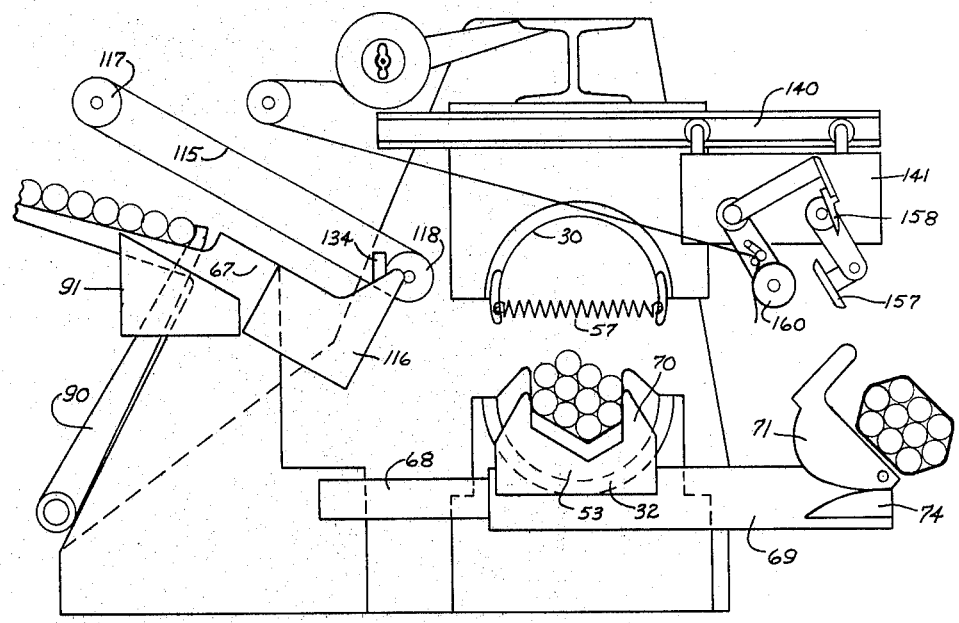
Figure 8:
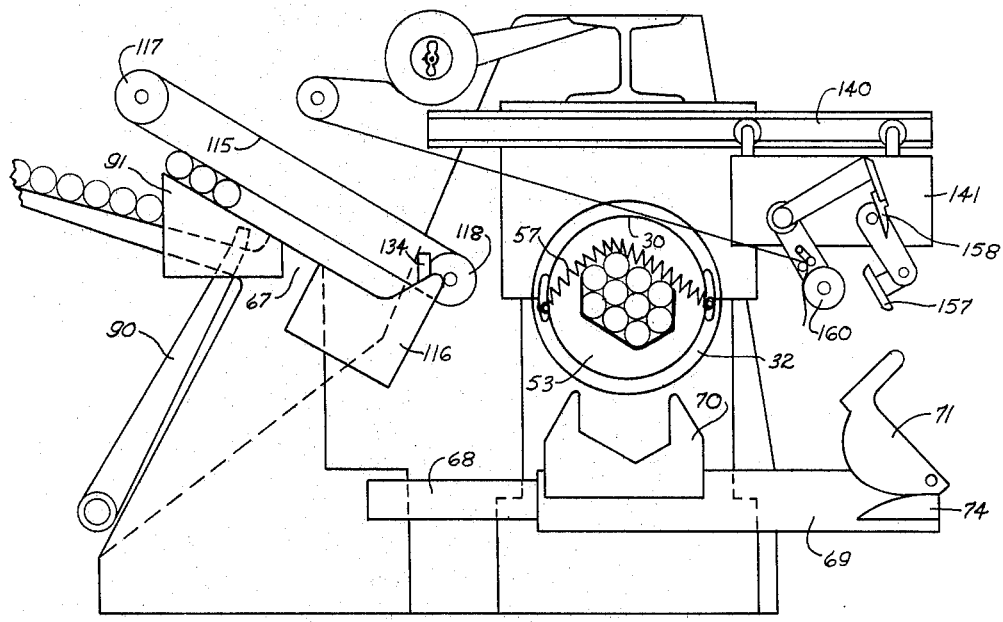

As is shown in FIGURE 7, the shift block 91 is then moved downwardly, out of intersecting relationship with the row of articles, and the row is moved toward and against stop gate arm 90 so that the first three tubes in the row are positioned directly above shift block 91. Meanwhile, the motor 40 is energized to begin moving jaw plate 33 and the lower jaw 32 upwardly toward the bundle which is to be wrapped, so that the bundle will be carried in removable insert 53 in lower jaw 32 toward the upper jaw 30. As this upward movement of the lower jaw 32 continues, the top of the bundle contacts the spring 57 which is stretched across the upper jaw 30, and said spring is extended by the movement of the bundle against it, as is shown in FIGURE 8, in order to hold the bundle firmly between the upper and lower jaws as the jaws are moved into contact with each other. At about the same time, compressed air is permitted to enter the air cylinder 106, causing shift block 91 to be moved upwardly to intersect the row of tubes, and that movement of said shift block causes the three tubes to be removed from the row and shifted into position against the under side of conveyor belt 115, as is shown in FIGURE 8.

Figure 9:
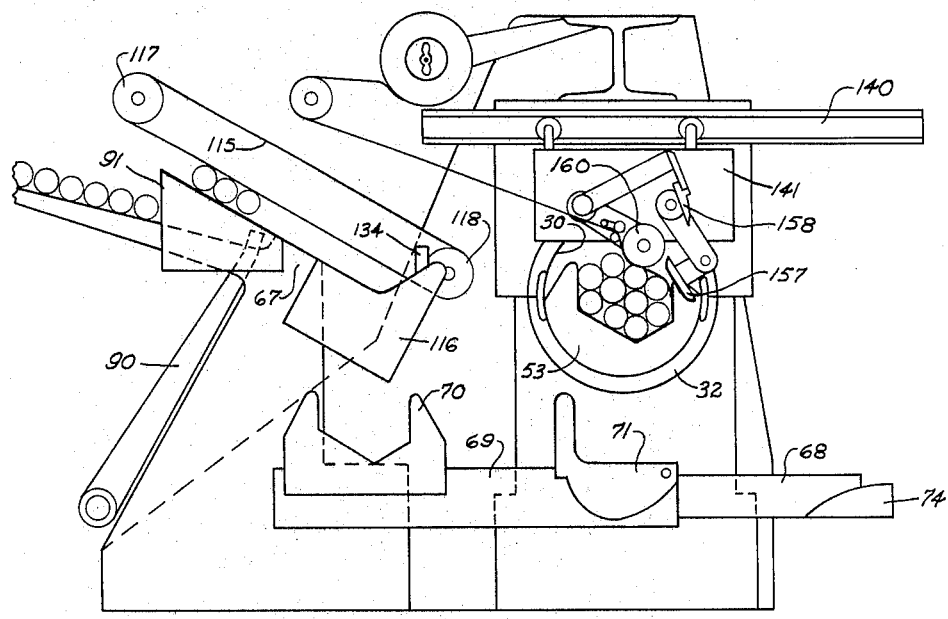

Referring now to FIGURE 9, the motor 124 is then energized to cause the conveyor belt 115 to be moved in order to convey the three shifted tubes toward cradle 116. Also, shift block 91 is held in intersecting relationship with the row of tubes, in order to prevent the movement of the row toward stop gate arm 90, while the motor 96 is energized to move stop gate arm 90 to the position in which it is located a distance equal to the diameter of four tubes from the first tube in the row which is bearing against the side of shift block 91. Meanwhile, the motor 81 is energized to move carriage plate 69 toward the forming means until the carriage stand 70 is positioned directly beneath cradle 116 and ejection stand 71 is positioned directly beneath the upper and lower jaws. At about the same time, the motor 145 is energized to move tape deck plate 141 toward the bundle which is held between the jaws, in order to tack the end of the tape T against the side of the bundle. The spring 57 is not shown in FIGURES 9 through 13 in order that the attaching of the tape around the bundle can be shown more clearly. Thus, in FIGURE 9 it will be seen that the end of the tape T is tacked to the side of the bundle by the movement of tape deck plate 141 to cause the end of the tape to contact the bundle with applying roller 160 bearing against the back of the tape, and the buffing ski 157 will be moved against the tacked end of tape as tape deck plate 141 is continued to be so moved on track beam 140.

Figure 10:
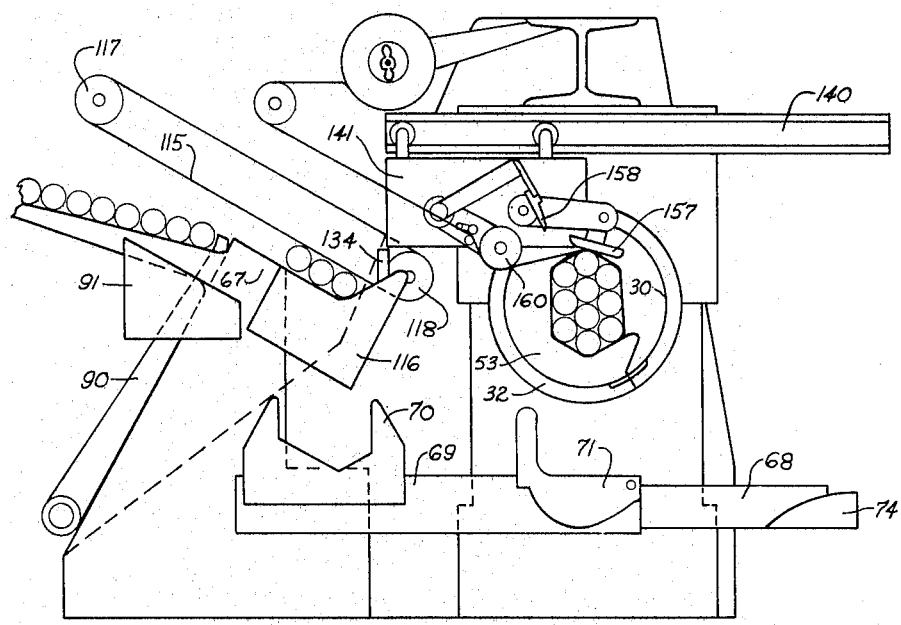

The next sequence in the operation of the machine is shown in FIGURE 10, wherein it can be seen that tape deck plate 141 has been moved to the extent of track beam 140 and buffing ski 157 contacts the back of the tape to attach the tape around the bundle after the motor 62 is energized to rotate the upper and lower jaws. The operation of motor 62 causes chain 59 to be moved around the sprockets 58 and the teeth 52 on the semi-circular shaped sprockets on both the upper jaw 30 and the lower jaw 32, so that both of said jaws are rotated as one piece on the bearings 46 which are contained in each of the jaw plates 31 and 33. That is, after the upper jaw 30 and the lower jaw 32 are moved and held into contact with each other, the jaws form a complete ring which can then be considered as a single unitary circular member which functions as one piece. In fact, the separate jaws, including the sprockets 51, can be made as a unitary circular piece, which is later divided to form the separate jaws. Thus, as the jaws are rotated and the bundle is held between them by the removable insert 53 and spring 57, the tape T is pulled from supply roll 167 and wrapped around the bundle to provide as many wraps of tape as there are complete revolutions of the bundle. Meanwhile, the conveyor belt 115 has moved the three shifted articles onto cradle 116, and the operation of the conveyor is then stopped. Also, shift block 91 has been moved back out of intersecting relationship with the row of tubes, and the tubes have moved toward and against stop gate arm 90, in the new position of said stop gate arm, so that there are then four tubes in position to be shifted out of the row by shift block 91.

Figure 11:
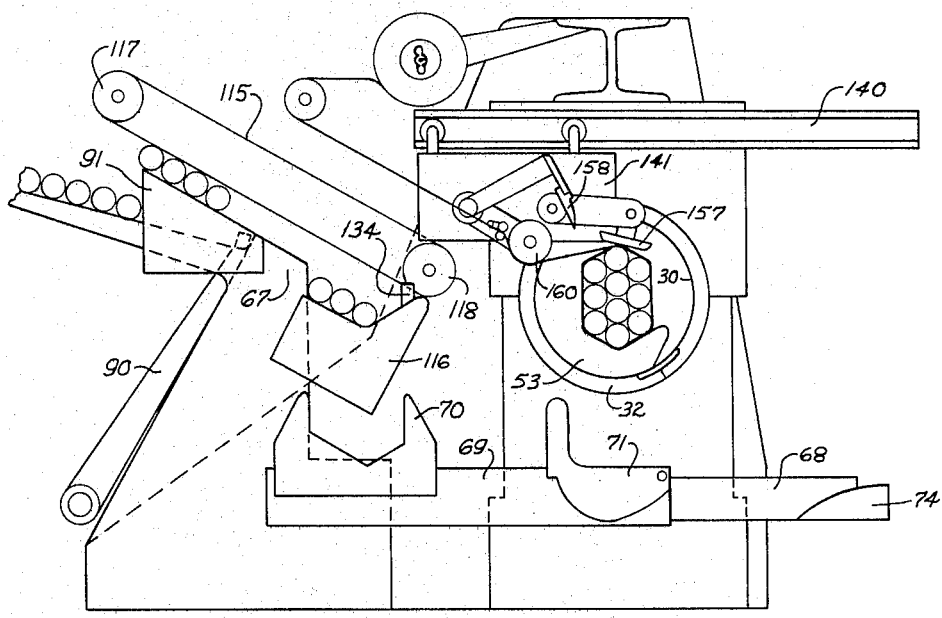

Referring now to FIGURE 11, it will be seen that the cradle 116 is then moved downwardly by the operation of motor 133 a distance equal to the diameter of one tube, and shift block 91 is then moved upwardly to shift the first four tubes out of the row and move them against conveyor belt 115. The motor 124 is then energized to drive conveyor belt 115 and move the four tubes toward cradle 116. Meanwhile, the jaws continue to be rotated in order to continue wrapping tape around the bundle, and that movement continues until three complete revolutions have been made, since this is the number of wraps of tape which are desired in this particular instance. Also, during this time, shift block 91 is in intersecting relationship with the row of articles, and stop gate arm 90 will begin to be moved to the position in which is a distance of three tube diameters from the first tube which is bearing against the side of shift block 91.

Figure 12:
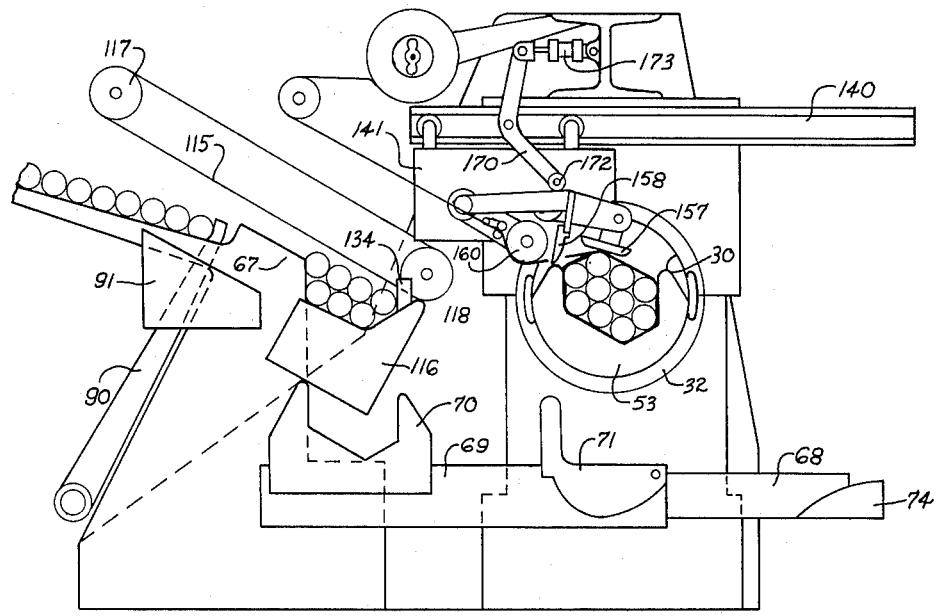

As is shown in FIGURE 12, conveyor belt 115 has continued to be moved until the four tubes are deposited in cradle 116, and said conveyor belt is then stopped. The cradle 116 will then begin to be moved downwardly a distance equal to the diameter of one tube. Meanwhile, the stop gate arm 90 has arrived at the three tube diameter position and shift block 91 has been moved back out of intersection with the row of articles, so the row of articles has moved for a distance of three tube diameters toward and against stop gate arm 90. Also, at the same time, and while the upper jaw 30 and lower jaw 32 are still being rotated together, compressed air is permitted to enter the cylinder 173 to cause cut-off arm 170 to be rotated and move knife arm 152 downwardly until knife blade 158 contacts the tape T and severs the tape from the supply roll 167.

Figure 13:
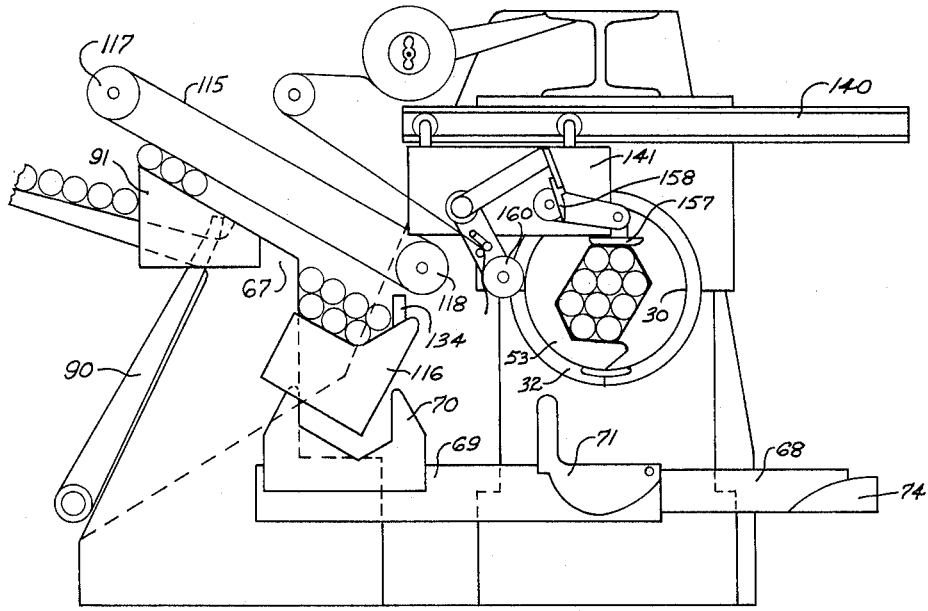

Referring now to FIGURE 13, after the tape T has been severed the supply of compressed air to air cylinder 173 is eliminated, and the spring contained in cylinder acts to return cut-off arm 170 to its original position. Thus, the spring 154 serves to return knife arm 152 to its original position. Meanwhile, jaws 30 and 32 continue to rotate while buffing ski 157 bears against the back of the tape in order to attach the severed end from the tape which has been wrapped around the bundle. Also, at the same time, cradle 116 has been moved downwardly again for a distance equal to the diameter of the tubes, and shift block 91 has been moved upwardly across the row of tubes to intersect the row and shift the three tubes out of the row and move them upwardly against the conveyor belt 115. The conveyor belt 115 is then operated to move the three tubes toward and into cradle 116.

Figure 14:
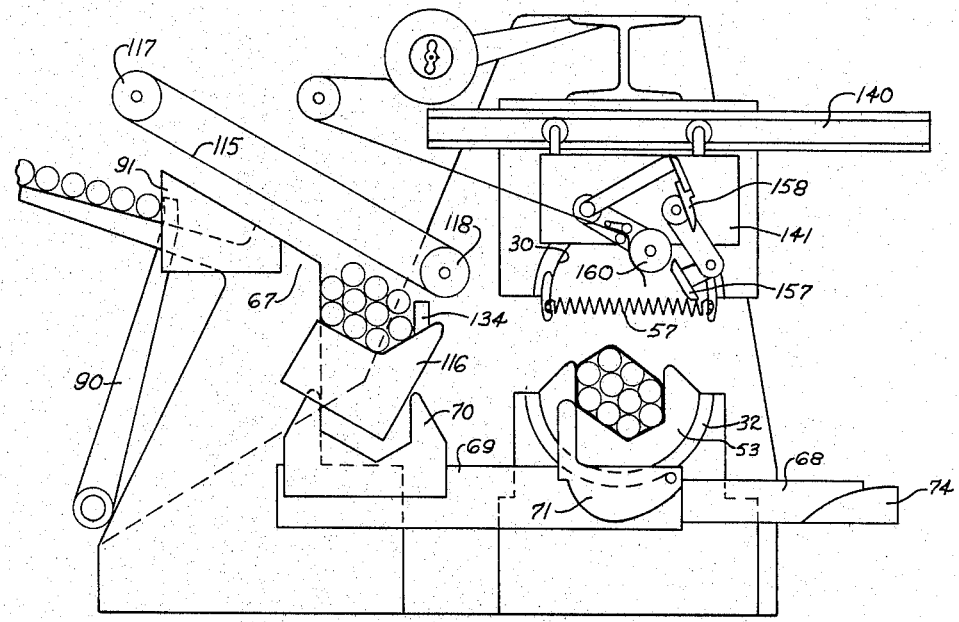

As is shown in FIGURE 14, as soon as those three tubes are deposited in cradle 116 the bundle which is to be wrapped has been formed, and conveyor 115 is stopped. Meanwhile, shift block 91 is in intersecting relationship with the row of tubes, and stop gate arm 90 is moved to the edge of the shift block in order to be ready to form a new bundle. The motor 133 is then operated to begin to lower cradle 116 to the extent of its movement toward platform 21. At the same time, the rotational movement of the jaws 30 and 32 has been stopped in the same position in which it was started, and motor 40 is energized to begin moving the lower jaw 32 with the wrapped bundle toward platform 21. Also, motor 145 has been energized to serve to move tape deck plate 141 back to the other end of track beam 140, so as to be ready to attach tape to the bundle which has been formed by the forming means during the time in which the previously formed bundle has been wrapped.

Figure 15:
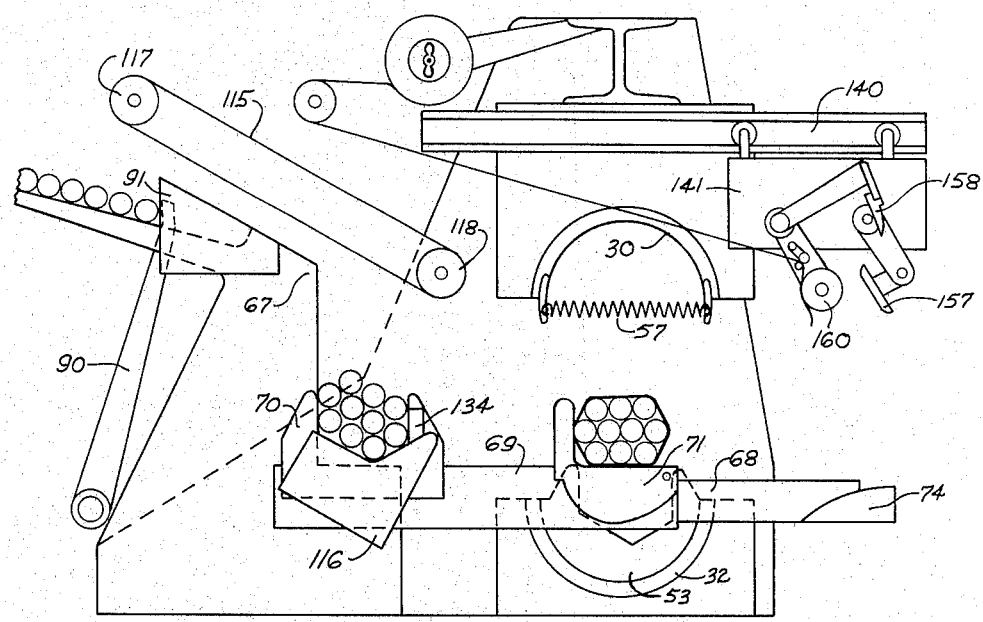

In FIGURE 15, the tape deck plate 141 is seen to have been moved back into its original position, and the jaw plate 33 and lower jaw 32 have been moved to the extent of their movement toward platform 21, so that the wrapped bundle has been deposited on ejection stand 71. Meanwhile, cradle 116 has been moved to the extent of its movement toward platform 21, so that the formed bundle which is to be wrapped has been deposited in carriage stand 70. The parts of the machine are then again in the position shown in FIGURE 5, and the motor 81 is then energized to move carriage plate 69 toward lower jaw 32 until carriage stand 70 containing the formed bundle to be wrapped is positioned directly above lower jaw 32. The newly formed bundle is then between lower jaw 32 and the upper jaw 30, in position to be wrapped, and the bundle which has been wrapped is, at the same time, ejected from the machine by the movement of ejection stand 71 against cam plate 74. Meanwhile, the cradle 116 is moved away from platform 21, to the extent of said movement, into position to begin the formation of another bundle. The operation of the machine is repeated as described above for as long as there are tubes from a supply which are to be formed into bundles and wrapped.

Variations in the construction and operation of the described embodiment can be envisioned. For example, well-known means for attaching wire or steel strapping to bundles can be substituted for the tape attaching means described above, and the means for forming, transporting or wrapping the bundles can be used independently in other machines. Such variations, embodying some or all of the novel features herein disclosed, are comprehended, and we do not intend to be limited only to the specific embodiment herein described, but, rather, we intend to be limited only by our disclosure taken as a whole, including the appended claims.

We claim:

1. In a machine for wrapping articles with a wrapping strip, a first semi-circularly shaped jaw rotatably attached to said machine and a second semi-circularly shaped jaw rotatably attached to said machine for movement toward and into contact with said first jaw to form a unitary circular ring with the articles to be wrapped carried by said second jaw until said articles are held between said jaws when said jaws are in contact with each other, means for rotating said ring while said jaws are in contact with each other to cause said articles to be rotated as said wrapping strip is wrapped around said articles, and means for moving said second jaw toward and away from said first jaw.

2. In a machine containing means for wrapping articles with a wrapping strip, a unitary carriage which is slidably attached to said machine for back and forth movement adjacent to said wrapping means, said carriage containing means for simultaneously supporting articles which are to be wrapped and articles which have been wrapped by said wrapping means, and means for sliding said carriage in one direction to transport articles to be wrapped toward said wrapping means and articles which have been wrapped away from said wrapping means and for sliding said carriage in the opposite direction to receive other articles which are to be wrapped.

3. In a machine for wrapping articles with a wrapping strip, means for successively forming orderly bundles containing a plurality of elongate articles to be wrapped together by said wrapping strip, said forming means comprising adjustably positionable selective means for controlling the amount of movement of a plurality of articles which are placed in side-by-side relationship in a row and are being moved in the direction of the width of said articles from a supply of said articles toward and against said selective means, shifting means movably positioned adjacent to said selective means for movement back and forth across the row of articles to intersect said row and thereby remove the articles which are proximate to said selective means from said row when said shifting means is moved in one direction and for preventing said movement of said row until said shifting means is moved out of intersecting relationship with said row of articles by movement in the opposite direction, means for driving said shifting means in said back and forth movement, means for adjustably positioning said selective means when said shifting means has been moved into intersecting relationship with said row of articles to a position which will determine the number of articles which will be removed from said row of articles by the next movement of said shifting means into intersecting relationship with said row of articles, a movable cradle positioned remote from said shifting means, means for sequentially conveying said shifted articles from said shifting means and depositing said articles into said cradle to form said shifted and conveyed articles into bundles to be wrapped, and means for moving said cradle after said articles have been deposited in said cradle to position said cradle during the formation of a bundle and to permit the bundle to be removed from said cradle to be wrapped with said wrapping strip in said machine.

4. A machine for wrapping articles with adhesive tape, said machine comprising a supporting structure and wrapping means, said wrapping means including a first semi-circularly shaped jaw and a second semi-circularly shaped jaw each rotatably attached to said supporting structure for relative movement toward and into contact with each other to form a unitary circular ring with the articles to be wrapped held between said jaws, means for rotating said ring while said jaws are in contact with each other to cause said articles to be rotated as said tape is held against said articles, to wrap said tape around said articles, and means for moving said jaws toward and away from each other.

5. A machine for wrapping articles with adhesive tape, said machine comprising a supporting structure and wrapping means, said wrapping means including a first semi-circularly shaped jaw rotatably attached to said supporting structure and a second semi-circularly shaped jaw rotatably attached to said supporting structure for movement toward and into contact with said first jaw to form a unitary circular ring with the articles to be wrapped carried by said second jaw until said articles are held between said jaws when said jaws are in contact with each other, means for rotating said ring while said jaws are in contact with each other to cause said articles to be rotated as said tape is held against said articles, to wrap said tape around said articles, and means for moving said second jaw toward and away from said first jaw.

6. A machine for wrapping articles with adhesive tape, said machine comprising a supporting structure, wrapping means and means for transporting articles which are to be wrapped toward said wrapping means and for simultaneously transporting articles which have been wrapped away from said wrapping means, said wrapping means comprising a first semi-circularly shaped jaw rotatably attached to said supporting structure, a second semi-circularly shaped jaw rotatably attached to said supporting structure for movement toward and into contact with said first jaw to form a unitary circular ring with the articles to be wrapped carried by said second jaw until said articles are held between said jaws when said jaws are in contact with each other, means for adhering the free end from a supply of adhesive tape to said articles, means for rotating said ring while said jaws are in contact with each other to cause said articles to be rotated to wrap tape from said supply around said articles, and means for moving said second jaw toward and away from said first jaw.

7. A machine for wrapping articles with adhesive tape, said machine comprising a supporting structure, wrapping means and means for transporting articles which are to be wrapped toward said wrapping means and for simultaneously transporting articles which have been wrapped away from said wrapping means, said wrapping means comprising a first semi-circularly shaped jaw rotatably attached to said supporting structure, a second semi-circulary shaped jaw rotatably attached to said supporting structure for movement toward and into contact with said first jaw to form a unitary circular ring with the articles to be wrapped carried by said second jaw until said articles are held between said jaws when said jaws are in contact with each other, means for adhering the free end from a supply of adhesive tape to said articles, means for rotating said ring while said jaws are in contact with each other to cause said articles to be rotated to wrap tape from said supply around said articles, and means for moving said second jaw toward and away from said first jaw; said transporting means comprising a movable unitary carriage containing means for supporting said articles which are to be wrapped by said wrapping means and articles which have been wrapped by said wrapping means, and means for moving said carriage to transport simultaneously said articles which are to be wrapped toward said wrapping means and articles which have been wrapped away from said wrapping means.

8. A machine for wrapping articles with adhesive tape, said machine comprising a supporting structure, wrapping means and means for transporting articles which are to be wrapped toward said wrapping means and for simultaneously transporting articles which have been wrapped away from said wrapping means, said wrapping means comprising a first semi-circularly shaped jaw rotatably attached to said supporting structure, a second semi-circularly shaped jaw rotatably attached to said supporting structure for movement toward and into contact with said first jaw to form a unitary circular ring with the articles to be wrapped carried by said second jaw until said articles are held between said jaws when said jaws are in contact with each other, means for adhering the free end from a supply of adhesive tape to said articles, means for rotating said ring while said jaws are in contact with each other to cause said articles to be rotated to wrap tape from said supply around said articles, and means for moving said second jaw toward and away from said first jaw; said transporting means comprising a unitary carriage which is slidably attached to said machine for back and forth movement adjacent to said wrapping means, said carriage containing means for simultaneously supporting articles which are to be wrapped and articles which have been wrapped by said wrapping means, and means for sliding said carriage in one direction to transport said articles to be wrapped toward said wrapping means and said articles which have been wrapped away from said wrapping means and in the opposite direction to receive articles which are to be wrapped.

9. A machine comprising means for successively forming orderly bundles containing a plurality of elongate articles to be wrapped together by adhesive tape, means for wrapping said bundles with said tape, and means for transporting said bundles which are to be wrapped from said forming means to said wrapping means and for simultaneously transporting bundles which have been wrapped away from said wrapping means; said forming means comprising adjustable positionable selective means for controlling the amount of movement of a plurality of articles which are placed in side-by-side relationship in a row and are being moved in the direction of the width of said articles from a supply of said articles toward and against said selective means, shifting means movably positioned adjacent to said selective means for movement back and forth across the row of articles to intersect said row and thereby remove the articles which are proximate to said selective means from said row when said shifting means is moved in one direction and for preventing said movement of said row until said shifting means is moved out of intersecting relationship with said row of articles by movement in the opposite direction, means for driving said shifting means in said back and forth movement, means for adjustably positioning said selective means when said shifting means has been moved into intersecting relationship with said row of articles to a position which will determine the number of articles which will be removed from said row of articles by the next movement of said shifting means into intersecting relationship with said row of articles, a movable cradle positioned remote from said shifting means and means for sequentially conveying said shifted articles from said shifting means and depositing said articles into said cradle to form successive bundles to be wrapped.

10. A machine comprising means for successively forming orderly bundles containing a plurality of elongate articles to be wrapped together by adhesive tape, means for wrapping said bundles with said tape, and means for transporting said bundles which are to be wrapped from said forming means to said wrapping means and for simultaneously transporting bundles which have been wrapped away from said wrapping means; said forming means comprising adjustably positionable selective means for controlling the amount of movement of a plurality of articles which are placed in side-by-side relationship in a row and are being moved in the direction of the width of said articles from a supply of said articles toward and against said selective means, shifting means movably positioned adjacent to said selective means for movement back and forth across the row of articles to intersect said row and thereby remove the articles which are proximate to said selective means from said row when said shifting means is moved in one direction and for preventing said movement of said row until said shifting means is moved out of intersecting relationship with said row of articles by movement in the opposite direction, means for driving said shifting means in said back and forth movement, means for adjustably positioning said selective means when said shifting means has been moved into intersecting relationship with said row of articles to a position which will determine the number of articles which will be removed from said row of articles by the next movement of said shifting means into intersecting relationship with said row of articles, a movable cradle positioned remote from said shifting means, means for sequentially conveying said shifted articles from said shifting means and depositing said articles into said cradle to form said shifted and conveyed articles into bundles to be wrapped, and means for moving said cradle after said articles have been deposited in said cradle to position said cradle during formation of a bundle and to permit the bundle to be removed from said cradle to be transported by said transporting means to said wrapping means.

References Cited by the Examiner
UNITED STATES PATENTS

| | | | |
|---|---|---|---|
| 1,969,160 | 8/1934 | Slusher | 53—198 |
| 2,054,602 | 9/1936 | Leaver | 100—7 |
| 2,596,862 | 5/1952 | Mirfield | 100—7 |
| 3,018,596 | 1/1962 | Dvorak et al. | 53—198 |

FRANK E. BAILEY, *Primary Examiner.*

TRAVIS S. McGEHEE, *Examiner.*

A. E. FOURNIER, L. S. BOUCHARD,
*Assistant Examiners.*